No. 871,122. PATENTED NOV. 19, 1907.
N. S. KINGSLEY.
TIMBER JACK.
APPLICATION FILED AUG. 16, 1907.
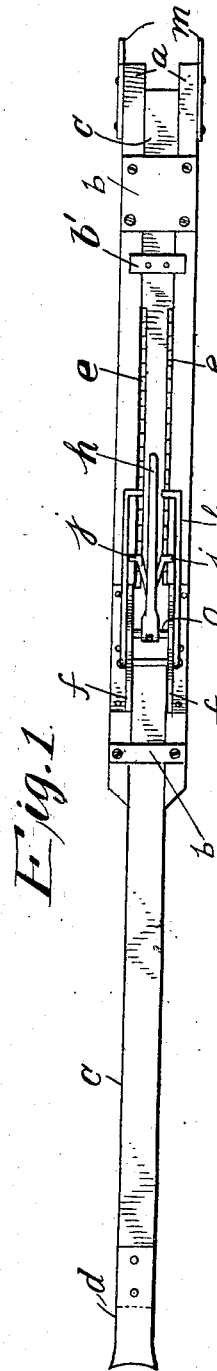
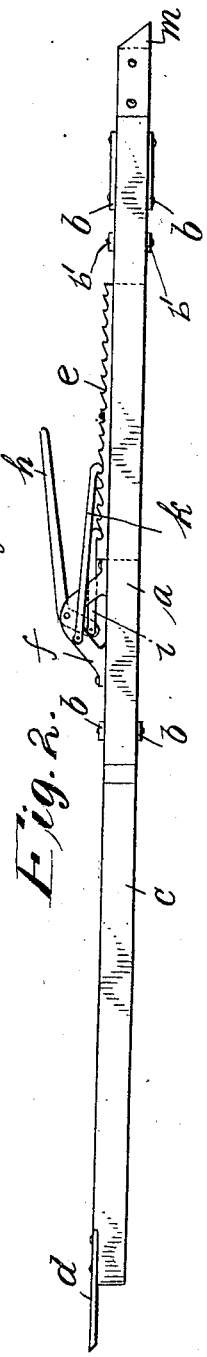
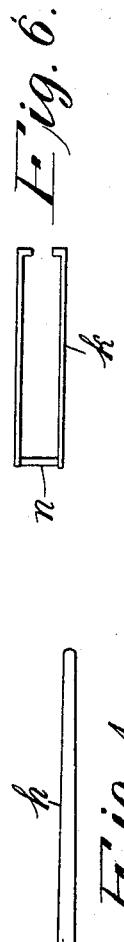
Witnesses:
Harry C. Hebig
M. Hamilton
Nathan S. Kingsley, Inventor
By his Attorney
James Hamilton

UNITED STATES PATENT OFFICE.

NATHAN S. KINGSLEY, OF WEST GOULDSBORO, MAINE.

TIMBER-JACK.

No. 871,122.   Specification of Letters Patent.   Patented Nov. 19, 1907.

Application filed August 16, 1907. Serial No. 388,774.

*To all whom it may concern:*

Be it known that I, NATHAN S. KINGSLEY, a citizen of the United States, residing at West Gouldsboro, in the county of Hancock and State of Maine, have invented certain new and useful Improvements in Timber-Jacks, of which the following is a specification, reference being had to the accompanying drawings.

My invention relates to improvements in devices for propping up trees during the operation of felling the same. Such devices are commonly called tree-props or timber-jacks.

An object of my invention is to provide a device of the character described which will be simple in construction, cheap in manufacture and efficient in operation.

In the drawings illustrating the principle of my invention and the best mode now known to me of applying that principle, Figure 1 is a plan and Fig. 2 is a side elevation of my new timber-jack; and Figs. 3, 4, 5 and 6 are details of parts hereinafter referred to.

The side-bars $a$ are connected by the plates $b$; and between the side-bars and the plates is slidably mounted a pole-prop $c$ the working end of which is provided with a pole-plate $d$. The working end of the latter is curved so as to fit the rounded contour of the tree (Fig. 1) and the edge of this curved part is a chisel edge, (Fig. 2), whereby the pole-plate is adapted to engage the wood of the tree securely. On the butt end of the pole-prop $c$ is fastened a pair of guide-plates $b'$, one on the upper and one on the lower face of the pole-prop, as shown in Figs. 1 and 2. On each side of the pole-prop $c$ is mounted a toothed plate $e$ (Fig. 3).

Upon each of the side-bars $a$ is bolted a standard $f$ which supports one end of a transverse shaft $g$ upon which is fulcrumed the operating lever $h$. (Fig. 4). The working end of the latter is forked and carries one end of a pawl $i$ the other or free end of which is forked and provided with laterally-extending ears $j$ (Fig. 5). The latter are adapted to engage with the teeth of the toothed plates $e$. Mounted free to swing in the standards $f$ is a locking grab $k$ having the rectangular shape shown in Fig. 6.

My new timber-jack is particularly adapted for use in the felling of timber and to aid the lumberman, when the wind is adverse or when the tree is inclined the wrong way. The device is placed against the tree at about an angle of forty-five degrees, the spike-plates $m$ attached to the lower end of the side-bars being forced into the ground firmly to afford a good support. The operating lever $h$ is raised at its handle end, thereby lowering its working end and the attached pawl $i$, the ears $j$ of which engage the teeth of the toothed plates $e$. The latter are also engaged by the bar $n$ of the locking grab or bail $k$ which serves to hold the pole-prop while the pawl $i$ is moved to take a fresh hold preparatory to raising the pole-prop $c$ another step. The pole-plate $d$ fits the rounded trunk of the tree and engages it by reason of its sharp or chisel edge (Fig. 2). The tree having been nearly cut through by saw or ax, the lever $h$ is worked up and down, gradually forcing the tree over.

I claim:

1. In combination in a timber jack, a pair of side-bars; a pole-prop mounted free to slide between said side-bars; a pole-plate mounted upon the working end of said pole-prop; a pair of toothed plates one of which is mounted upon said pole-prop between the latter and each of said side-bars, the teeth of said plates projecting above the top of said side-bars and pole-prop; a pair of standards one of which is mounted on each of said side-bars; a locking bail mounted free to swing in said standards, the free end of said bail being adapted to engage said teeth; a pawl formed with laterally-extending ears adapted to engage said teeth; and an operating lever supported by said standards and attached to said pawl for actuating the same.

2. In combination in a timber jack, a pair of side-bars; a pole-prop mounted free to slide between said side-bars; a pole-plate mounted upon the working end of said pole-prop and having its free end curved and formed with a chisel edge; a pair of toothed plates one of which is mounted upon said pole-prop between the latter and each of said side-bars; a pair of standards one of which is mounted upon each of said side-bars; a locking bail mounted free to swing in said standards, the free end of said bail engaging the teeth of both said plates; a pawl the free end of which is forked and formed with laterally-extending ears, each of said ears engaging the teeth of one of said plates; and an operating lever supported by said standards and attached to said pawl for actuating the same.

In witness whereof I have hereunto set my hand at Winter Harbor, Maine, this thirty first day of July, 1907, in the presence of the two witnesses undersigned.

NATHAN S. KINGSLEY.

Witnesses:
FRANK P. NOYES,
E. E. SODERHOLTZ.